Jan. 30, 1951 — P. G. MUELLER — 2,539,748
AUTOMATIC REGENERATION CONTROL
APPARATUS FOR WATER SOFTENERS

Filed Nov. 21, 1945 — 3 Sheets-Sheet 1

Inventor
Paul G. Mueller;
R. S. Berry
By
Attorney

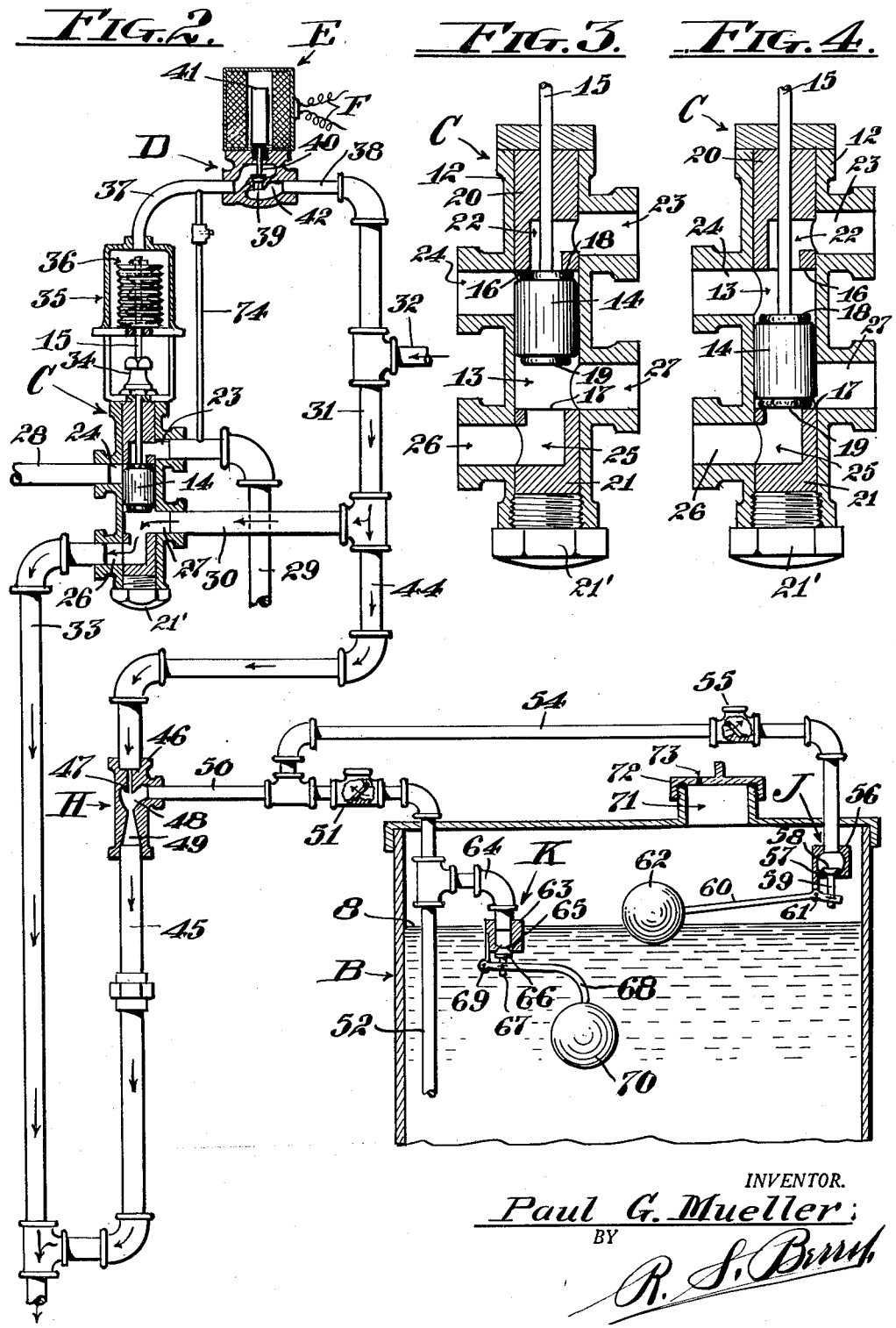

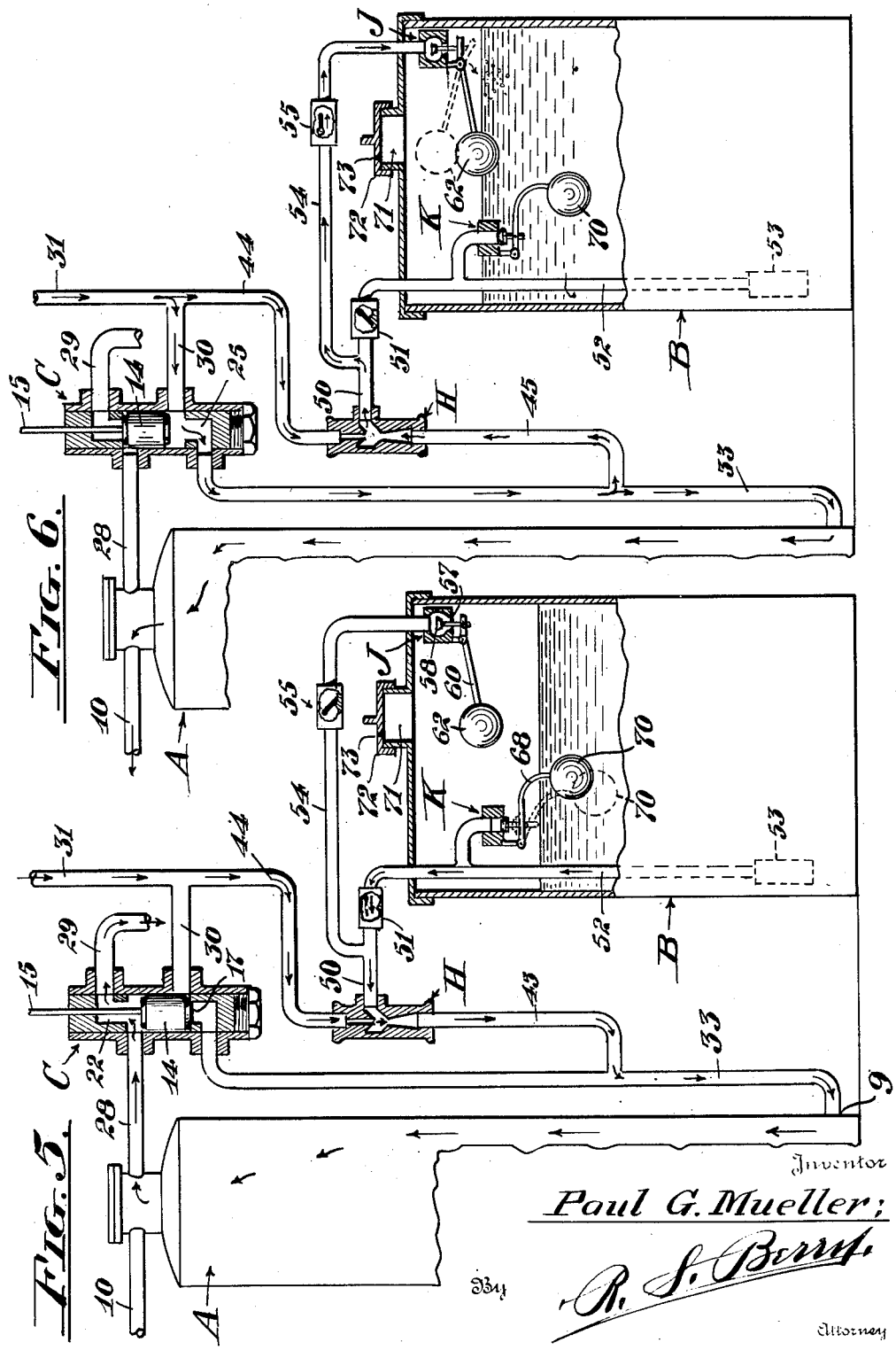

Patented Jan. 30, 1951

2,539,748

UNITED STATES PATENT OFFICE 2,539,748

AUTOMATIC REGENERATION CONTROL APPARATUS FOR WATER SOFTENERS

Paul G. Mueller, Los Angeles, Calif.

Application November 21, 1945, Serial No. 629,978

6 Claims. (Cl. 210—24)

This invention relates to regeneration apparatus for water softeners and has as its primary object the provision of means for controlling the flow of liquids in water softening apparatus of the type in which water softening minerals are regenerated from time to time by subjecting them to the action of brine.

Another object is to provide a water softener embodying a mineral containing water softening tank, together with a salt and brine reservoir in which a measured charge of brine may be automatically directed from the brine reservoir through the water softener tank and in which means are provided for automatically replacing the discharged brine with fresh water to recondition the apparatus for a subsequent operation.

A particular object of the invention is to provide a liquid flow control valve which is adapted to be actuated by fluid pressure controlled mechanism which in turn is adapted to be put in operation through the medium of an electrically actuated instrumentality whereby the regenerating apparatus may be set in operation by closing a normally open electric switch and in which means are provided for terminating the regeneration operation at a predetermined time either under manual or automatic control.

Another object is to provide a novel control valve for a water softener of the above character adapted to be so connected to the water softener tank and to the brine supply reservoir as to permit the flow of water through the softener tank and to the service mains when the valve is in one position and will allow the flow of brine from the reservoir through the water softener tank to waste followed by the flow of wash water from the supply mains to waste when in another or second position.

Another object is to provide a construction and arrangement in the control valve which will insure against leakage of water to waste when the valve is positioned to direct the flow of water through the softener tank to service.

Another object is to provide a control valve in which the parts may be readily and economically constructed and assembled.

Another object is to provide automatic means controlled by differential levels of liquid in the brine reservoir whereby when the control valve is in its second position a measured volume of brine will be initially directed through the water softener tank followed by a flow of wash water through the tank directed from the fresh water supply.

A further object is to provide an automatic water softener regenerating apparatus which will permit of frequent regenerating operations, whereby a water softening apparatus of lesser capacity may be employed than is ordinarily provided for a given demand.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 2 is an enlarged view, partly in section, illustrating the control mechanism of the apparatus shown in Fig. 1;

Fig. 3 is an enlarged view in vertical section of the control valve showing the valve in its normal position during the water softening operation;

Fig. 4 is a view similar to Fig. 3 showing the valve in its alternate or second position;

Fig. 5 is a diagram illustrating the parts as disposed during the regenerating operation and preliminary to the flushing operation;

Fig. 6 is a diagram similar to Fig. 5 showing the parts as positioned after completion of the flushing operation and during refilling of the brine tank.

Figure 1:
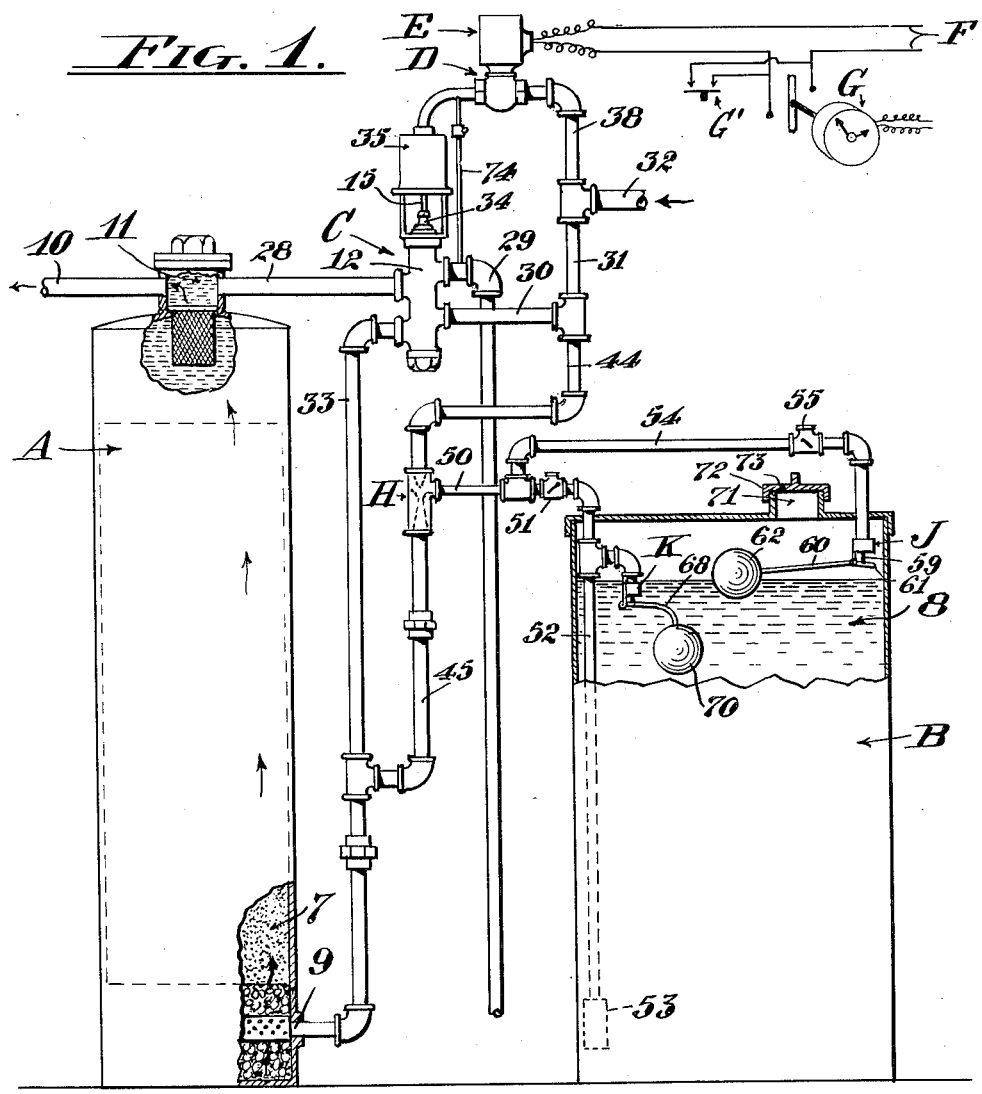
Fig. 1 is a view in side elevation of the apparatus with portions broken away showing the parts as positioned during the water softening operation.

Referring to the drawings more specifically, A indicates a water softening tank containing conventional water softening minerals 7 in a usual fashion, and B designates a reservoir containing a volume of brine 8, together with a quantity of salt. The water softener tank A is here shown as comprising the up-flow type fitted with a water inlet 9 in the lower portion thereof and with a discharge service pipe 10 leading from an outlet chamber 11 at the upper end thereof.

In carrying out the invention a two-position control valve C is provided which is here shown as embodying a housing 12 containing a cylindrical chamber 13 in which is mounted a reciprocal piston 14 carried on a stem 15 projecting from the upper end of the housing. Opposed valve seats 16 and 17 are arranged in the housing 12 forming the ends of the chamber 13 and between which the piston 14 is adapted to travel. One end of the piston is provided with a cushion 18 arranged to cooperate with the valve seat 16 and the other end of the piston is fitted with a cushion 19 arranged to cooperate with the valve seat 17.

The valve seats 16 and 17 are formed respectively on plugs 20 and 21 snugly fitted in the end portions of the housing 12. The plug 20 is formed with a passage 22 which leads from the seat 16 and opens laterally to an outlet passage 23 formed in the valve housing. An inlet passage 24 opens through the valve housing to the chamber 13 adjacent the valve seat 16. The plug 21 is formed with a passage 25 leading from the seat 17 and opening to a discharge outlet passage 26 in the valve housing. A second inlet passage 27 opens through the valve housing to the chamber 13 adjacent the valve seat 17. The outlet and inlet passages 23 and 24 are offset relative to each other so that the seat 16 will lie therebetween, and likewise the outlet and inlet passages 26 and 27 are offset relative to each other so that the seat 17 will lie therebetween. The plug 21 is removable to give access to the interior of the valve and to permit removal and replacement of the piston 14. A screw cap 21' is threaded into the lower end of the housing 12 to hold the plug 21 in place.

The valve C is mounted with the inlet 24 thereof connecting with a conduit 28 leading to the outlet chamber 11 of the tank A, and with the outlet passage 23 connecting with a waste pipe 29, while the inlet passage 27 is connected to a conduit 30 leading from a manifold or distributing pipe 31 connecting with a hard water supply pipe 32, the discharge passage 26 is connected to a conduit 33 leading to the tank inlet 9.

The stem 15 of the piston 14 passes through the plug 20 and through a packing gland 34 into a housing 35 and connects with an actuator 36 in the latter here shown as comprising a spring pressed bellows whereby the valve 14 is normally maintained in its upper or outermost position closing the valve seat 16. Opening to the housing 35 is a water supply pipe 37 which connects through a normally closed cut-off valve D with a pipe 38 leading to the manifold pipe 31 whereby water under pressure may be directed into the housing 35 to operate the actuator 36 of the control valve C. The valve D embodies a valve member 39 on a stem 40 which is here shown as electrically controlled; the stem being connected with a core 41 of a solenoid magnet E. However the valve D may be operated manually in conventional fashion. The valve 39 is normally disposed in a closed position against a seat 42. Where the magnet E is employed it is connected to the conductors of an electrical circuit F leading to a source of electrical current supply, preferably through a normally open time switch G and a manually controlled switch G' provided in the circuit to control flow of current through the coil of magnet E.

Leading from the manifold 31 is a conduit 44 connecting through an injector H with a conduit 45 connecting with the pipe 33; said conduits 44 and 45 constituting a by-pass line around the valve C. The injector H embodies a housing 46 formed at one end with a nozzle 47 with the intake end of which the conduit 44 connects, and which nozzle opens to a chamber 48 from which leads a diverging passage 49 opening directly opposite the nozzle 47 and connecting with the conduit 45.

A pipe 50 leads laterally from the chamber 48 and connects through a rearwardly opening check valve 51 with a conduit 52 leading downwardly into the reservoir B and opening thereto through a screen 53 adjacent the bottom of the reservoir; the conduit 52 and pipe 50 together with the pipe 45 constituting a siphon whereby liquid may be drawn from the reservoir B as will be later described.

Connecting with the pipe 50 between the injector H and the check valve 51 is a pipe 54 which leads through a forwardly opening check valve 55 to a float controlled valve J arranged in the upper portion of the reservoir B; the valve J embodying a housing 56 formed with a valve seat 57 surrounding an opening leading to the reservoir B on which is adapted to be seated an upwardly opening cut-off valve 58 fitted with a downwardly extending stem 59. A lever 60 pivoted at 61 on the valve housing 56 has a short arm thereof connected to the valve stem 59 and has a long arm fitted with a float 62 arranged to be elevated by a rising level of the brine 8 in the reservoir B to effect closing of the valve 58 when a predetermined level of the brine is reached. A float controlled vacuum breaker valve K is arranged in the reservoir B which embodies a hollow housing 63 the interior of which connects with the conduit 52 through tubing 64. The interior of the valve housing 63 opens downwardly into the reservoir B through a valve seat 65 located at a predetermined level below the level of the surface of the brine 8 at which the float 62 maintains the valve J closed. A downwardly opening valve 66 is adapted to engage the valve seat 65 and is fitted with a stem 67 connecting with an arm 68 pivoted at 69 on the valve housing 63 and which arm is fitted with a float 70 whereby the valve 66 is maintained closed until the level of the liquid in the reservoir B falls to a point sufficiently to permit the float 70 to move downwardly and effect opening of the valve 66.

The reservoir B is provided in its top wall with an opening 71 fitted with a removable closure cap 72 formed with a vent 73, through which opening salt or strong brine may be delivered to the reservoir as occasion may require to maintain the brine 8 at suitable strength.

A bleeder pipe 74 leads from pipe 37 to the waste pipe 29 through which water may flow to discharge from the housing 35 on upward movement of the actuator 36.

In order to regulate the flow of water through the system conventional control valves or pressure regulators may be employed as occasion may require, and which is not necessary to be here shown.

In the operation of the invention the piston 14 is normally disposed in its upper or outermost position as shown in Figs. 2 and 3 so that water from the supply pipe 32 may flow under pressure through the manifold 31 to conduit 30 through the chamber 13 and passage 25 of the valve C and into the lower end portion of the tank A through the conduit 33 and also through conduits 44—45, as indicated by the arrows in Fig. 2, whereby on opening an outlet in the service line 10 water will be caused to flow upwardly through the tank 8 and to supply conduit 10 as indicated by the arrows in Fig. 1. The water in flowing through the tank A is subjected to the softening action of the mineral 7 therein in the usual fashion.

When it is desired to effect regeneration of the mineral 7 the piston 14 of the control valve C is moved to its alternative or second position shown in Figs. 4 and 5 thereby cutting off the flow of water through the control valve to the conduit 33 by reason of the cushion 19 of the piston 14 then seating on the valve seat 17. This movement of the valve is effected by the mechanism here shown by directing water under pressure into the housing 35 above the valve actuator 36. This may be effected by energizing the magnet E to open the valve 39 so that water under pressure from the feed pipe 32 will pass through pipe 38, valve D and pipe 37 into the housing 35. The piston 14 will remain in the second position as long as the solenoid is maintained energized which will be throughout the length of time the switch G or G' is closed. It will be understood that the time switch G is empoyed when automatic control of the regeneration operation is desired, and that switch G' will be used when manual control is desired. When the piston 14 is in its second or alternate position the upper end of the tank A is open to discharge through the conduit 28, valve passage 22 and drain pipe 29, and when this occurs water under pressure will be directed from the manifold 31 through the conduit 44, injector H, conduit 45 and conduit 33 to the lower end of the tank A, then upwardly through the latter to discharge through the waste pipe 29, as indicated by the arrows shown in Fig. 5.

The flow of water through the injector H will act to create a partial vacuum in the conduits 50 and 52 so as to effect induction of brine from the reservoir B through the then open check valve 51 so that a charge of brine will be directed into the tank A and through the mineral therein. The initial action of the injector serves to fill the upper portion of the vertical pipe 52 and the horizontal pipe 50 with liquid from the brine reservoir and when this occurs downward flow of liquid in the pipe 45 will establish a siphoning action until the flow of brine delivered to the tank A will cause the level of the brine in the reservoir B to fall until the float 70 moves down to the position indicated in dotted lines in Fig. 5 and thereby open the valve K to atmosphere, thereby negativing the action of the injector H breaking the siphoning action and terminating the flow of brine from the reservoir to the tank A. A measured definite volume of the brine may thus be delivered to the tank A according to the set of the valve K and float 70.

On this discontinuation of the flow of brine to the tank A fresh water will flow through the injector H without functioning the latter so as to effect a flushing action of the contents of the tank A and effect removal of brine therefrom, such flushing action continuing throughout whatever period of time the piston 14 is maintained in its secondary position. During this operation the check valve 55 will remain closed and valve J will be open.

When it is desired to restore the apparatus to its water softening condition the piston 14 is shifted to its initial position shown in Fig. 3, which in the construction here shown is effected by opening the switch G or G' so as to de-energize the magnet E and allow the valve D to close, thus cutting off the water supply to the valve actuator housing 35.

A spring associated with the valve actuator 36 will act to retract the piston thereof so as to move the piston 14 to its seated position on the valve seat 16 thereby cutting off the flow of water from the upper end of the tank A through conduit 28 and through the passage 22 of the valve C to wastes and opening communication from the water source through passage 25 of the valve C and through conduit 33 to the lower end of the tank A. The water displaced by the retraction of the piston in the housing 35 is directed to discharge through the bleeder pipe 74 leading from the pipe 37 to the waste pipe 29, which bleeder pipe is normally open but is of such small capacity relative to that of the valve D as not to negative the action of water pressure directed to the housing 35 on the actuator 36.

On the piston 14 being moved to open the communication between the source of water supply to the lower end of the tank A through the control valve C, water will also be directed into and through the injector H without functioning the latter by reason of the water flow into the injector being from both ends thereof. A portion of the water entering the injector will then flow through the pipe 54, check valve 55 and the then open valve J into the reservoir B so as to replenish the volume of liquid drawn from the reservoir B during the regenerating operation. This flow of the water into the reservoir B, indicated by the arrows in Fig. 6, will continue until the level of the liquid in the reservoir elevates the float 62 into a position such as to effect closing of the valve J. Rising of the liquid level in the reservoir B also elevates the float 70 and closes the vacuum breaker valve K and restores the apparatus to a condition in readiness for another regenerating operation.

By constructing the control valve C as set forth leakage of water to waste when the piston 14 is in its upper most position will be effectively prevented by reason of the cushion 18 then being tightly pressed against the seat 16 under the urge of water pressure imposed against the lower end of the piston. The piston 14 serves at all times to close direct communication between the inlet passage 27 and the passages 23 and 24.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a water softening apparatus, a tank having an inlet and an outlet, a liquid supply conduit connected to the inlet of said tank, a waste pipe connecting with said tank outlet, valve means for alternately closing said waste pipe and cutting off the flow of liquid therethrough to the tank inlet, a by-pass connecting said inlet to the liquid supply conduit around said valve, a reservoir, a conduit leading to said reservoir, an injector in said by-pass connected to said conduit for injecting liquid from said reservoir into said tank inlet controlled by disposing said valve means in its alternate positions, a float controlled air inlet valve in said conduit within said reservoir for opening said conduit to atmosphere on delivery of a predetermined volume of liquid from said reservoir, a pipe leading from said injector to the upper portion of said reservoir, and a float controlled valve within said reservoir connected to said pipe for delivering a refilling charge of liquid to said reservoir.

2. In a water softening apparatus, the combination of a tank having an inlet and an outlet, a divided liquid feed line connecting with said inlet, a cut-off control valve in one branch of said line, an injector in the other branch of said line, a reservoir, a discharge pipe leading from said reservoir to said injector, a float controlled vacuum breaker valve in said reservoir for opening said discharge pipe to atmosphere on discharge of a predetermined volume of liquid from said reservoir, a liquid feed pipe leading from said injector to said reservoir, a float controlled valve on said feed pipe in said reservoir for closing said feed pipe on delivery of a refilling charge of liquid to said reservoir; a waste pipe connected to said tank outlet through said cut-off control valve, a valve element in said control valve moveable to alternately open and close the liquid feed line through said control valve, and to alternately open and close the connection between the tank outlet and said waste pipe, and means for actuating said control valve.

3. In a water softening apparatus, a water softener tank, a water feed line leading to said tank, an injector in said line, a brine reservoir, a discharge pipe leading from said reservoir to said injector, a check valve in said feed line opening toward said injector, a feed pipe leading from said injector to said reservoir, a check valve in said feed pipe opening toward the reservoir, a float valve in said reservoir closing said feed pipe when brine in the reservoir is at a predetermined level, a float controlled valve in said reservoir connected to said discharge pipe for opening the latter to atmosphere when the brine falls to a predetermined level, and means for placing said injector in and out of operation.

4. In a water softening apparatus, a water softener tank, having an inlet and an outlet, a water feed line leading to the inlet of said tank, a two-position hydraulically operated valve in said line, a branch line leading to said inlet, an injector in said line, a salt and brine reservoir, a discharge pipe leading from said reservoir to said injector, a check valve in said discharge pipe opening towards the injector, a float operated valve in said reservoir attached to said discharge pipe for opening the latter to atmosphere when the liquid in the reservoir falls to a predetermined level, a feed pipe leading from said injector to the reservoir, a check valve in said feed pipe opening towards said reservoir, a float valve in said reservoir closing said feed pipe when liquid in said resevoir is at a predetermined level, and means for supplying and relieving fluid pressure to the hydraulically operated valve to cause it to assume either of its two positions.

5. In a water softening apparatus, a softener tank having an inlet in its lower portion and an outlet chamber at its upper end, a discharge service pipe and a waste conduit connected to said outlet chamber, a two position control valve connected to said inlet and to said waste conduit which in one position will direct water to said inlet and close said waste conduit and in the other position will cut off the water supply through the valve to said inlet and then open the waste conduit, a by-pass line leading around said valve and connecting with the tank inlet, an injector in said line having a chamber through which water is directed under pressure to said tank inlet when said control valve is positioned to cut off the water supply to said inlet; a brine containing reservoir, a pair of valves associated with said reservoir, one of which is a vacuum breaker valve, floats in said reservoir for independently controlling said valves one of which closes the associated vacuum breaker valve when brine is at a predetermined level in said reservoir and when the brine falls below such level opens the vacuum breaker valve, and the other of which floats opens its associated valve when the brine is lowered below the aforesaid predetermined level and closes its associated valve when the level of the brine is at a predetermined level above that at which the vacuum breaker valve is closed under the influence of the brine, and means for directing brine from said reservoir through said injector into said tank inlet when said vacuum breaker valve is closed and the other float controlled valve is open, and means for directing water from the source of supply through said injector into said reservoir through said float controlled valve while it and said vacuum breaker valve are open.

6. In a water softening apparatus, a softener tank having an inlet in its lower portion and an outlet chamber at the upper end thereof, a discharge pipe and waste conduit leading from said outlet chamber, a control valve connected to said waste conduit and to said tank inlet which in one position will direct water from a source of supply to said inlet and in another position will direct liquid from said outlet chamber through said waste conduit, means for actuating said valve, a by-pass line leading around said valve and connecting with said tank inlet, an injector in said by-pass line having a chamber therein, a brine containing reservoir, a pipe leading from said injector chamber, a rearwardly opening check valve with which said pipe connects, a conduit leading from said check valve and extending downwardly into said brine reservoir and opening at a point near the bottom thereof, a float controlled vacuum breaking valve in said reservoir fitted to said conduit normally closed when brine in said reservoir is at a predetermined level and open when the brine falls below such level, a pipe leading from said first named pipe at a point in front of said check valve and extending into the upper end of said reservoir, a forwardly opening check valve in said last named pipe, and a reverse acting float controlled valve in said reservoir with which the end of said last named pipe connects, said float controlled valve being closed when the brine in the reservoir is at a predetermined level above that at which said vacuum breaking valve is closed under the influence of the brine, and being opened when the brine is lowered below such predetermined levels.

PAUL G. MUELLER.

REFERENCES CITED

The following references are of record in the file of this patent:

UNITED STATES PATENTS

| Number | Name | Date |
| --- | --- | --- |
| 1,362,673 | Caps | Dec. 21, 1920 |
| 1,632,610 | Lindsay | June 14, 1927 |
| 1,707,692 | Ter Beest | Apr. 2, 1929 |
| 1,744,493 | Nix | Jan. 21, 1930 |
| 1,751,061 | Ter Beest | Mar. 18, 1930 |
| 1,799,266 | Wallace | Apr. 7, 1931 |
| 1,811,890 | Lindsay | June 30, 1931 |
| 1,842,825 | Cunningham | Jan. 26, 1932 |
| 1,851,927 | McCord | Mar. 29, 1932 |
| 1,893,933 | Dotterweich | Jan. 10, 1933 |
| 1,949,044 | Dotterweich | Feb. 27, 1934 |
| 1,976,439 | Dotterweich | Oct. 9, 1934 |
| 2,082,623 | Gauss | June 1, 1937 |
| 2,137,406 | Johnson | Nov. 22, 1938 |
| 2,329,350 | Kaysen, Jr. | Sept. 14, 1943 |